United States Patent Office 2,809,182
Patented Oct. 8, 1957

2,809,182

USE OF HYDROXYTETRONIC ACID AS AN ACCELERATOR OF POLYMERIZATION

Gordon J. Mirr, Tomahawk, and Alfred R. Bader, Milwaukee, Wis., assignors to Pittsburgh Plate Glass Company No Drawing. Application October 21, 1954,
Serial No. 463,817

6 Claims. (Cl. 260—45.4)

This invention relates to a method for polymerizing mixtures of ethylenically unsaturated monomers containing a CH$_2$=C< group and polyesters of polyhydric alcohols with alpha-beta ethylenically unsaturated dicarboxylic acids, and it pertains more particularly to the use of hydroxytetronic acid to accelerate the polymerization of such mixtures.

It is known that polyesters of glycols and alpha-beta ethylenically unsaturated dicarboxylic acids will polymerize with monomers containing CH$_2$=C< such as styrene or vinyltoluene, when heated in the presence of a free radical initiator such as benzoyl peroxide or cumene hydroperoxide. The resulting products are thermosetting resins known in the art as "polyester resins," and have enjoyed outstanding commercial success because of their excellent hardness, chemical resistance and other desirable properties. Clear, hard, thermoset resins can be obtained even at atmospheric pressures, although the polymerization process does require the application of relatively high temperatures over a substantial period of time. These polyester resins have been used to prepare clear castings, laminates, and as reinforcing agents for fibrous materials, such as fabrics or mats of fibers of glass or other materials. The fibrous material may be impregnated with the polyester resin, or the resin may be applied as a surface coating, or a combination of methods may be employed.

Because the preparation of polyester resins ordinarily does require heating for substantial periods of time, much time and effort have been expended in attempts to obtain materials which will assist the action of the free radical catalyst in accelerating the polymerization reaction. A number of materials useful for this purpose have been found; however, many of these materials are not completely satisfactory in that they sometimes decompose at the polymerization temperature, cause undesirable color formation in the polyester resin, or have other harmful effects upon the resin.

It has now been discovered that hydroxytetronic acid,

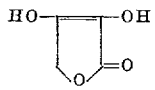

is a powerful accelerator of the polymerization of mixtures of ethylenically unsaturated monomers and glycol-unsaturated alpha-beta dicarboxylic acid polyesters, even at relatively low temperatures, effectively bringing about gelation and even substantially complete cure at normal room temperatures. Apparently hydroxytetronic acid is effective as an activator of the free radical initiator, and probably assists in liberating and transmitting the free radicals, although the invention is not to be limited by this explanation.

A great many polymerizable polyester resin compositions to which hydroxytetronic acid may be added to accelerate the polymerization rate are readily available as commercial products. Monomer components containing a CH$_2$=C< group, preferably in terminal position, which can be used in preparing polyester resins include styrene, divinylbenzene, vinyltoluene, methyl methacrylate, methyl acrylate, acrylonitrile, and the like.

Alpha-beta ethylenically unsaturated dicarboxylic acids suitable for use in the preparation of polyesters, which in turn may be utilized in the practice of the present invention, include maleic acid, fumaric acid, aconitic acid, mesaconic acid, citraconic acid, ethylmaleic acid, pyrocinchoninic acid, xeronic acid, itaconic acid, and the like. The alpha-beta ethylenically unsaturated dicarboxylic acids are also often mixed with substantial quantities of non-ethylenic dicarboxylic acids, such as phthalic acid, terephthalic acid, tetrachlorophthalic acid, succinic acid, adipic acid, suberic acid, azelaic acid, sebacic acid, dimethylsuccinic acid, chlorinated derivatives of the above acids, and the like. Where a non-ethylenic dicarboxylic acid is utilized, the proportion thereof may be varied widely; however, ordinarily the amount employed will vary within the range of about 0.25 to 10 or 12 moles of the saturated acid for each mole of the alpha-beta ethylenically unsaturated dicarboxylic acid component.

Glycols which can be utilized in the preparation of polyesters include ethylene glycol, diethylene glycol, triethylene glycol, polyethylene glycol, dipropylene glycol, 1,2-propylene glycol, 1,3-propane diol, butylene glycol and the like. These glycols may be reacted with any of the foregoing alpha-beta ethylenically unsaturated dicarboxylic acids or mixtures of the same with saturated dicarboxylic acids, the glycol being present in substantially stoichiometric amounts or in a slight excess, for example, 5 percent to 10 percent, to give useful polyesters. The esterification reaction involves heating the glycol component and the dicarboxylic acid components together at a temperature sufficient to evolve water. The reaction is continued until water ceases to evolve and an acid number below about 50 or 60 is attained. In no event should the heating be continued until insoluble products are obtained.

The ethylenically unsaturated monomer component of the polymerizable mixture will ordinarily be employed in a proportion of about 10 percent to 60 percent by weight of the total composition, and mixtures containing about 20 to 40 or 50 percent by weight of monomer are preferred.

The unsaturated polyester and the monomeric component are preferably mixed while the polyester component is hot, for example, at a temperature of about 100° C. to 150° C. The polymerizable mixture of the polyester and the monomer tends to gel rapidly at elevated temperatures. In order to avoid premature gelation during the formation and subsequent storage of the mixtures, it is customary to add a gelation inhibitor. Quaternary ammonium compounds, such as trimethylbenzylammonium chloride, triethylbenzylammonium chloride, or other quaternary ammonium salts such as those disclosed in U. S. Patent 2,593,787 are excellent gelation inhibitors in the uncatalyzed mixtures above described. Ordinarily, the gelation inhibitor is employed in an amount of about 0.001 percent to about 5.0 percent, based upon the weight of the interpolymerizable mixture. Preferably, the addition of the gelation inhibitor is made to one of the components of the polymerizable mixture before the mixture is formed. For example, the quaternary ammonium salts may be added to the hot polyester, the latter being maintained at a temperature of about 100° C. to 150° C. Other useful gelation inhibitors include tertiary butylcatechol, 3-sec. butylcatechol, 3-isopropylcatechol, oxalic acid, and quinone or hydroquinone. Mixtures of phenolic inhibitors such as the catechols or hydroquinone with quaternary ammonium salts may also be used. In the absence of catalysts, or accelerators, mixtures of polyesters containing a gelation inhibitor are stable for long periods of time. When the mixtures are to be used for casting, laminating, or other purposes, catalysts and/or accelerators are added in accordance with the present invention.

While hydroxytetronic acid can be used without added free radical catalysts and over a period of time will effect an adequate cure of the polymerizable polyester resin without a catalyst, it is often desirable to employ one of the conventional free radical initiator type catalysts. Suitable catalysts include acetyl benzoyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and p-methoxyphenyl diazo-thio-(2-naphthyl)ether.

The amount of free radical catalyst utilized may be varied widely; in general, however, it is preferred to use from about 0.1 percent to 5.0 percent by weight, based upon the total weight of the polymerizable mixture.

Hydroxytetronic acid is effective as a promoter of gelation and curing of the interpolymerizable mixtures over a relatively broad range of proportions. For example, amounts as small as 0.01 percent to as high as 1.0 percent or more by weight of the interpolymerizable mixture can be used with good results. The hydroxytetronic acid may be added approximately concurrently with or subsequent to the addition of the free radical initiator, which is ordinarily added shortly before the time of cure of the polyester resin.

As indicated hereinabove, hydroxytetronic acid is a solid at ordinary conditions of temperature and pressure. Hence, in order to facilitate its incorporation into an interpolymerizable mixture of a polyester of an alpha-beta ethylenically unsaturated dicarboxylic acid and a glycol, with a monomer, such as styrene, it is often desirable to dissolve the hydroxytetronic acid in a solvent, such as diethylene glycol or the like. Other solvents which are substantially non-reactive with respect to the interpolymerizable mixture may also be employed.

The preparation of polymerizable polyester resins, and the use of hydroxytetronic acid in accelerating the polymerization of such resins, are illustrated in the following examples. The examples are not intended to limit the invention, however, for there are, of course, numerous possible variations and modifications.

Example I

A polymerizable polyester resin was prepared from components consisting of 0.5 mole of diethylene glycol, 1.0 mole of phthalic anhydride, 3.0 moles of maleic anhydride, and 3.9 moles of propylene glycol. The resulting polyester was mixed with styrene in amounts such that the mixture contained 2 parts of polyester and 1 part of styrene. The mixture was stabilized against premature gelation by incorporating therein 0.02 part of hydroquinone per 100 parts of polyester, the hydroquinone being added to the hot polyester component. This mixture in the absence of catalysts or accelerators was stable and could be stored for long periods of time at room temperature without any substantial tendency to gel.

The polymerizable mixture was then catalyzed with 2 percent by weight of benzoyl peroxide (based on the weight of the polymerizable component and 1 percent by weight of a 33 percent solution hydroxytetronic acid in diethylene glycol was added an accelerator of polymerization. The "gel time" at 77° F. was then determined as follows: A sample of the resin was placed in a tube 125 mm. long and 16 mm. diameter, with a thermometer in the center of the tube. The "gel time" is the time in seconds when both the tube and the sample can be lifted by means of the thermometer. The composition containing both benzoyl peroxide and hydroxytetronic acid gelled in only 5 minutes, while the sample containing no hydroxytetronic acid required more than 60 hours to gel. The resin containing the hydroxytetronic acid cures to give a hard, clear material.

Examples II and III

Two polyesters were prepared, utilizing diethylene glycol, phthalic anhydride, maleic anhydride, propylene glycol and styrene in the proportions recited in Example I. To one polyester was added 0.0022 percent of tertiary butyl-catechol and to the other was added 0.0015 percent of quinhydrone. Both compositions thus prepared were stable for long periods of time when stored at room temperatures.

A portion of each composition was catalyzed with 2.0 percent by weight of benzoyl peroxide. The catalyzed mixtures were then divided into two parts and to one part was added 1.0 percent by weight of a 33 percent solution of hydroxytetronic acid in diethylene glycol. The other part was utilized as a control sample. The catalyzed mixtures were then heated to 77° F. and the gel times determined according to the method described in Example I. The polyester containing tertiary butylcatechol and hydroxytetronic acid had a gel time of 2 minutes, while the control sample containing tertiary butylcatechol required more than 60 hours to gel. The polyester containing quinhydrone and hydroxytetronic acid also gelled in only 2 minutes, while the control sample required more than 60 hours to gel.

The compositions containing the hydroxytetronic acid cure readily to give castings and laminates which have many valuable properties. It is apparent, therefor, that the hydroxytetronic acid functions as an excellent accelerator without affecting the desirable properties of the cured polyester resin.

Example IV

A polyester was prepared from the following components in the amounts set forth below:

| Component: | Parts by weight |
|---|---|
| Propylene glycol | 2713 |
| Maleic anhydride | 1575 |
| Phthalic anhydride | 2378 |
| Styrene | 2190 |
| Trimethylbenzylammonium chloride | 15.4 |
| Quinone | 0.5 |

The composition thus obtained was relatively stable and could be stored for several months without harmful results. A portion of this composition was catalyzed with 1.0 percent by weight of benzoyl peroxide and the catalyzed mixture was divided into two portions; to the first portion was added 1.0 percent by weight of hydroxytetronic acid, and the second portion was utilized as a control. The sample containing the hydroxytetronic acid gelled in only 17 minutes at 77° F. while the sample containing no hydroxytetronic acid required more than 35 hours to form a gel at 77° F.

Example V

A polymerizable polyester useful as an impregnant for glass fibres and other fibrous materials was prepared from the following components in the amounts set forth:

| Component: | Parts by weight |
|---|---|
| Propylene glycol | 2764 |
| Phthalic anhydride | 2617 |
| Maleic anhydride | 1420 |
| Styrene | 2263 |
| 3-isopropylcatechol | 0.89 |

The polyester thus prepared was tested to determine its gel time in the same manner as the polyester in Example IV. The sample containing hydroxytetronic acid formed a gel in only 25 minutes at 77° F. while the control sample required more than 140 hours to form a gel at the same temperature.

The polyester resin composition containing the hydroxytetronic acid polymerizes readily to give useful castings, laminates and the like. This particular polyester resin composition is especially useful in combination with glass fibers to produce fishing rods and similar articles.

The foregoing examples demonstrate that hydroxytetronic acid accelerates the polymerization of polyester resin compositions regardless of the composition of the polyester and the gelation inhibitor which is incorporated in the resin during preparation to inhibit polymerization during periods of shipment and storage. Hydroxytetronic acid also functions as an accelerator regardless of the free radical initiator which is employed. Thus, such other peroxygen compounds as cumene hydroperoxide, or methyl ethyl ketone peroxide, can be substituted for benzoyl peroxide in the above examples with good results.

From the foregoing description of the invention, it is apparent that hydroxytetronic acid is an excellent accelerator of polymerization for use in polyester resin compositions and that polyester resin compositions containing hydroxytetronic acid form a new class of useful materials. It is not intended to limit the invention to the specific examples, but to include all of the variations and modifications falling within the spirit and scope of the appended claims.

We claim:

1. A method of accelerating the polymerization of a mixture of an ethylenically unsaturated monomeric compound and a polyester of an alpha-beta ethylenically unsaturated dicarboxylic acid and a polyhydric alcohol, which comprises adding to said mixture hydroxytetronic acid of the structural formula

2. A method of accelerating the polymerization of a mixture of a monomer containing a single $CH_2=C<$ group and a polyester of a dihydric alcohol and an alpha-beta ethylenically unsaturated dicarboxylic acid, which comprises adding to said mixture a small catalytic amount of hydroxytetronic acid of the structural formula

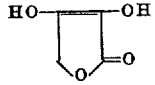

3. The method of claim 2 wherein the monomer containing a single $CH_2=C<$ group is styrene.

4. The method of claim 3 wherein the polyester is a polyester of diethylene glycol, phthalic anhydride, maleic anhydride, and propylene glycol.

5. The method of claim 4 wherein the hydroxytetronic acid is present in an amount of about 0.01 percent to about 1.0 percent by weight based upon the total weight of the mixture.

6. A method of accelerating the polymerization of a composition comprising an ethylenically unsaturated monomeric compound and a polyester of a polyhydric alcohol and a mixture of an alpha, beta-ethylenically unsaturated dicarboxylic acid and a saturated dicarboxylic acid, which comprises adding to said composition hydroxytetronic acid of the structure

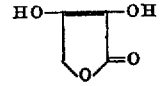

No references cited.

U. S. DEPARTMENT OF COMMERCE
PATENT OFFICE

CERTIFICATE OF CORRECTION

Patent No. 2,809,182                          October 8, 1957

Gordon J. Mirr et al.

It is hereby certified that error appears in the printed specification of the above numbered patent requiring correction and that the said Letters Patent should read as corrected below.

Column 2, line 34, for "components" read -- component/s --; column 3, line 71, after "added" insert -- as --.

Signed and sealed this 22nd day of April 1958.

(SEAL)
Attest:

KARL H. AXLINE
Attesting Officer

ROBERT C. WATSON
Commissioner of Patents